BENDING-RESPONSIVE ELECTROMECHANICAL TRANSDUCER DEVICE

Filed March 18, 1953 2 Sheets-Sheet 1

INVENTOR.
CHARLES K. GRAVLEY
BY Harris A. Mumma Jr.
ATTORNEY

July 1, 1958 C. K. GRAVLEY 2,841,722

BENDING-RESPONSIVE ELECTROMECHANICAL TRANSDUCER DEVICE

Filed March 18, 1953 2 Sheets-Sheet 2

INVENTOR.
CHARLES K. GRAVLEY
BY
Harris A. Mumma Jr.
ATTORNEY 2,841,722

BENDING-RESPONSIVE ELECTROMECHANICAL TRANSDUCER DEVICE

Charles K. Gravley, Lakewood, Ohio, assignor, by mesne assignments, to Clevite Corporation, Cleveland, Ohio, a corporation of Ohio Application March 18, 1953, Serial No. 343,054

20 Claims. (Cl. 310—8.5)

This invention relates to bending-responsive electromechanical transducer devices, and more particularly to such devices incorporating polycrystalline bodies of electromechanically sensitive dielectric materials.

Dielectric bending-responsive devices are well known to the art in the form of two piezoelectric plates or bars cemented together firmly in face-to-face relationship. Patent No. Re. 20,213 to C. B. Sawyer, resissued December 22, 1936, and assigned to the same assignee as the present invention, is concerned with such bender devices of single-crystalline Rochelle salt. One arrangement shown therein may be called a series-connected device. The crystallographic orientations of the crystal plates are chosen with two appropriate corresponding axes oppositely oriented in the two plates, so that a signal voltage, applied across electrodes provided on the exposed major surface of each plate, produces electric signal fields in series, that is, in the same thickness direction, in the two plates. This causes one plate to expand in a major surface direction and the oppositely oriented plate to contract simultaneously in the same direction. The mechanical constraint imposed by cementing together the inner faces of the two plates, whereby shear strains are set up at the interface, transforms these expansive and contractive strains into a relatively large bending distortion of the composite element.

The Sawyer resissue patent also shows an alternative parallel-connected arrangement requiring an inner electrode, provided on the adjacent surfaces of the two plates, which are cemented together with identically oriented crystallographic axes. When a signal voltage is applied between the two outer electrodes, connected together in parallel, and this inner electrode, there is obtained at a lower electrical impedance a similar bending response by virtue of the oppositely directed electric signal fields in the two identically oriented plates. Of course, electric signal fields and corresponding signal voltages may be produced in all such piezoelectric devices, utilizing the converse response in the bending mode, by applying mechanical signal forces to the elements to cause the bending distortions.

Many variations of these bending-responsive transducers have been devised. For example, an attempt has been made to approximate the inner electrode of a parallel-connected element by drilling a small hole or holes near the central plane of a block of quartz, or by milling notches in the central plane around the edges of such a block, and electroding the interior surfaces of the holes or notches. Machining such holes or notches is difficult and costly, especially when the block is sufficiently thin to exhibit a reasonable bending compliance. In practice the number and lateral extent of the holes or notches must be very limited, so that the signal field configuration differs drastically in over half of the quartz from the thickness fields required to excite the bending mode, resulting in great degradation in the electromechanical efficiency. Furthermore, with such a single piece of piezoelectric crystal only the parallel connection can be used, and the necessity of providing firmly anchored signal lead wires from the electrodes in the holes or slots introduces additional problems. In fact, the series-connected double plate benders have proved especially attractive because they avoid the signal connection to a central electrode.

Other modified bender devices have been developed. Thus, in accordance with one feature of Patent No. 2,373,-445 to H. G. Baerwald, assigned to the same assignee as the present invention, a bender element is formed by milling out most of the central portions of a crystal piece of a piezoelectric material such as Rochelle salt to form a wide central slot, leaving two plate-like portions above and below the slot which are joined together only at opposite ends of the bender element. Outer electrodes are provided and interconnected, while the opposed interior surfaces formed by the milling operation are electroded for the other signal connection. The Baerwald device is distinguished from the previously mentioned bending devices in that the two plate-like portions of the device are coupled mechanically only at two opposed ends of the plates, rather than over much of the opposed surfaces thereof. This modifies the nature of the constraint developed between the two plate-like portions during bending. The Baerwald patent also shows other features, in accordance with which, instead of hollowing out the interior of a single crystal section, a similar result is obtained by disposing two separate sections in spaced face-to-face relationship and by affixing the opposed faces to each other adjacent to their ends; with this arrangement an intermediate brace may be added between the plates parallel to the joined ends of the plates to prevent buckling.

With the advent of the titanate-type, polycrystalline, electromechanically sensitive dielectric materials, which may take the form of ceramic transducer bodies of barium titanate as disclosed and claimed in the Patent No. 2,486,560 to R. B. Gray, it has become possible to obtain a bending-responsive device by cementing together two ceramic plates. A ceramic plate of such a dielectric material, if polarized by the application of a high unidirectional electric potential in the thickness direction, responds to the application of an electric signal potential in a thickness direction by developing strains parallel to its major surfaces. If two such plates, cemented together face-to-face, are polarized in opposite thickness directions, the development of an electric signal field in the same thickness direction in both plates is associated with a bending response, since one plate expands while the other contracts. In the Patent No. 2,484,950 to H. Jaffe, assigned to the same assignee as the present invention, there is disclosed and claimed a bender device including unidirectional polarizing means for maintaining a polarizing bias field in the two plates, thus enhancing the bending response compared with the response obtainable when reliance is placed on remanent polarization in the desired thickness directions.

A further development in the field of titanate-type polycrystalline transducers is described and claimed in the Patent No. 2,614,143 to A. L. W. Williams, assigned to the same assignee as the present invention, which deals with hollow or tubular transducers. A ceramic tube of barium titanate material may be given a flattened cross-sectional shape so as to have two essentially flat sides connected throughout the length of the tube by two narrow, rounded portions. When the outer surfaces of the flat sides are provided with separate electrodes and the inside of the flattened tube is electroded, polarizing potentials may be applied between the inside electrode and the temporarily parallel-connected outside electrodes. Then application of electric signal potentials across the two outside electrodes causes one flat wall of the tube to expand longitudinally while the other contracts with resultant bending of the axis of the tube. Of course, the constraint developed between the two flat sides of the plate to effect a bending response is provided only through the two narrow, curved edge portions of the flattened tube, so that the distribution of the shear and expansive strains tends to be quite different from that found in the arrangement of the above-mentioned Jaffe patent, in which the entire opposed faces of two ceramic plates are cemented together.

While transducing arrangements of the types exemplified by most of the bender devices referred to hereinabove may be quite satisfactory in many applications, each is subject to certain inherent limitations. In one of the devices described hereinabove a quartz block must be subjected to a difficult drilling or milling operation to obtain an inefficient substitute for a central electrode. In certain other devices, of tubular form, the mechanical constraint necessary for response in a bending mode is obtained along only two opposed edges or at only the two ends of the bending device. In still other devices resort is had to the use of cements in affixing together the two plates of a bending-responsive element; such devices are mechanically composite due to the different and usually inferior elastic properties of the cementing material as compared with the electromechanically sensitive material itself. In addition, with several of the arrangements described hereinabove a series connection cannot be used, since it is necessary to provide a central electrode with associated signal lead connections in order to obtain simultaneous expansion and contraction in the respective sides of the transducer element.

Consequently it is an object of the invention to provide a new and improved bending-responsive electromechanical transducer device which substantially avoids one or more of the limitations or disadvantages of the transducers of the types described hereinabove.

It is another object of the invention to provide a new and improved bending-responsive electromechanical transducer device providing a high degree of electromechanical coupling.

It is a further object of the invention to provide a new and improved bending-responsive electromechanical transducer device exhibiting greater mechanical strength during fabrication and during use than is obtainable with bender devices of tubular form.

It is yet another object of the invention to provide a new and improved bending-responsive electromechanical transducer device having a noncomposite dielectric transducer element and utilizing in operation a series connection of its external electrodes.

It is still another object of the invention to provide a new and improved bending-responsive electromechanical transducer device which may be fabricated readily of inexpensive materials.

In accordance with the invention, a bending-responsive electromechanical transducer device comprises a polycrystalline body of electromechanically sensitive dielectric material having two spaced thickness portions, generally parallel to each other and each of substantial thickness, joined into one body by at least three laterally separated masses of such material connecting the two thickness portions, the body, including the connecting masses, being ceramically bonded throughout so as to be mechanically noncomposite. The device also comprises electrodes disposed individually on each outer surface of the above-mentioned two thickness portions and on portions of the inner surfaces thereof not replaced by the laterally separated connecting masses, these electrodes being adapted to carry unidirectional electric potentials corresponding to polarizing fields directed in opposite thickness directions in the two thickness portions of the body, and the electrodes on the outer surfaces being adapted to carry electric signal potentials corresponding to electric signal fields directed at a given instant in the same thickness direction in the two thickness portions. Also included in the device is mechanical means coupled to the ceramic body so that motion of the mechanical means is associated with bending of outer surface elements of the body, such bending involving at a given instant lateral contraction and expansion respectively of one and the other of the two thickness portions as constrained by the connecting masses, and the contraction and expansion being electromechanically coupled with the aforementioned electric signal fields when the electromechanically sensitive material is conditioned by the oppositely directed polarizing fields in the two thickness portions of the body.

It will be understood that the ceramic material is conditioned by the polarizing fields whether the material is in a state of remanent electrostatic polarization as the result of a previous temporary application of polarizing potentials thereacross, or whether any remanent effects are augmented by the continuous application of a biasing unidirectional polarizing potential. It will be understood also that, as used in this specification and in the appended claims, the condition produced by such electrical conditioning treatments is contemplated by the terms "polarized" or "polarization." This so-called polarization of a titanate-type polycrystalline material, in accordance with one theory, is the result of non-random directional changes induced by the applied unidirectional potential in a spontaneous polarization already present at certain temperatures in small, randomly oriented crystalline domains in the material. However, such theoretical aspects are not a part of the present invention, and the polarized condition of a polycrystalline body usually may be recognized by the ability of the body to respond to mechanical stresses by developing electrical charges and in particular by the linearity and substantial magnitude of its electromechanical responses.

For a better understanding of the present invention, together with other and further objects thereof, reference is had to the following description taken in connection with the accompanying drawings, and its scope will be pointed out in the appended claims.

In the drawings, Fig. 1 is a representation partly in perspective and partly in schematic form, of a bending-responsive electromechanical transducer device embodying the invention, along with associated equipment;

Figure 1:
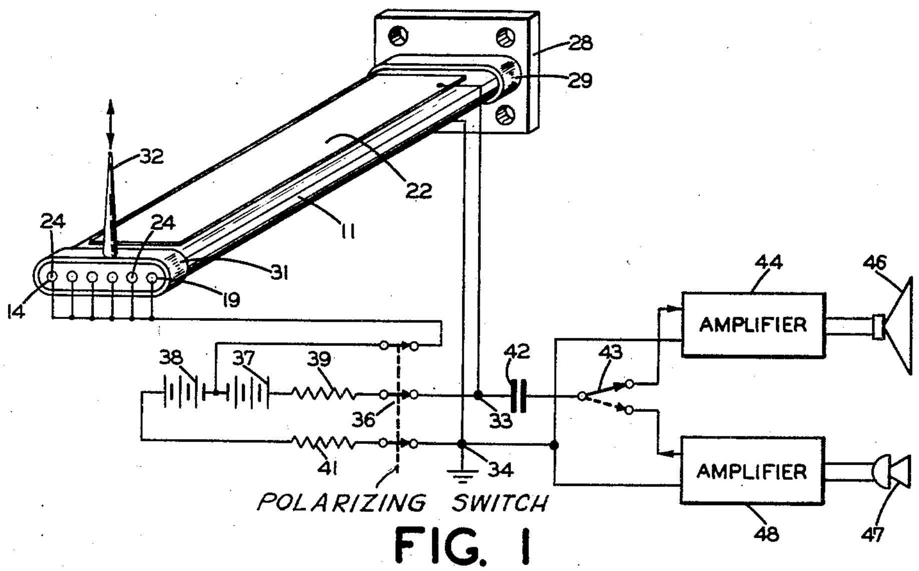

Referring now to Fig. 1 of the drawings, there is shown in perspective view a bending-responsive electromechanical transducer device embodying the invention. Also shown in schematic form in Fig. 1 are the associated circuits for polarizing the material of the transducer element as well as circuits for supplying electrical signal energy to the device or for utilizing the electrical signal energy developed by the device. The transducer device comprises a polycrystalline body 11 of electromechanically sensitive dielectric material. Preferably the body 11 is of titanate-type ceramic dielectric material, and best results usually are obtained with a ceramic material consisting primarily of barium titanate. Such a material is capable of retaining remanent electrostatic polarization in high degree after suitable conditioning with a unidirectional polarizing potential in a manner to be described hereinbelow.

Figure 2:
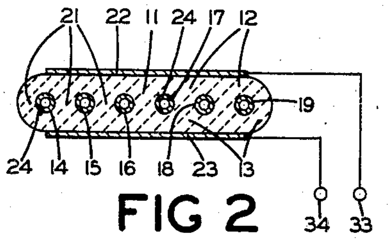
Fig. 2 is a cross-sectional view of the transducer element of the device illustrated in perspective in Fig. 1.

In Fig. 2 the transducer element formed by the body 11 is shown in cross-sectional elevation, the section being taken perpendicular to the length direction of the body. The view of Fig. 2 is on an enlarged scale as compared with the perspective view of Fig. 1 to permit easier representation of details. It will be seen that the body 11 may be considered to be made up of three thickness portions, being the upper, central, and lower thickness portions as viewed in Fig. 2. Thus the upper and lower portions form two spaced opposed thickness portions, generally parallel to each other and each of substantial thickness. These thickness portions may be designated the outer thickness portions of the body and are referred to by the reference numerals 12 for the upper thickness portion and 13 for the lower thickness portion as seen in the drawings. Each of these portions has a substantial thickness dimension as measured at the thinnest regions thereof, and these thinnest regions will be seen by reference to Fig. 2 to be the regions directly above and directly below any one of a plurality of generally parallel spaced holes 14–19 extending through the dielectric material of the body 11 from the front to the rear thereof as viewed in Fig. 1. The parts of the body 11 laterally of the six holes 14–19, that is, between the holes, to the left of the hole 14, and to the right of the hole 19 as seen in Fig. 2, together constitute a central thickness portion 21 of the body between the outer thickness portions 12 and 13. The last-mentioned parts of the body make up at least three, and in this case seven, laterally separated masses of the dielectric material connecting the upper and lower thickness portions 12 and 13. Thus the central thickness portion 21, including these laterally separated connecting masses of the polycrystalline material, along with the two outer thickness portions 12 and 13, together form a single body, which, for the purpose of convenience of description, has been designated as containing the several portions just mentioned.

This body 11, including the connecting masses of its central thickness portion, is ceramically bonded throughout so as to be mechanically noncomposite. This bonded state may be obtained by a conventional ceramic-firing operation, to which the body is subjected after forming in the green state by any suitable procedure. Such a fired ceramic body, as is well known, is composed of numerous crystalline grains bonded each to the other by vitreous or semi-vitreous material. After an adequate ceramic-firing operation the ceramic bonds are sufficiently strong and uniform throughout the body that, at least as regards elastic deformations of the material, no substantial interface exists between contiguous masses of the material in the body, which then behaves under mechanical strains as a unitary structure and may be designated mechanically noncomposite. This structural condition may be contrasted with that of the conventional bending-responsive transducers containing two plates cemented together, since the elastic properties in the immediate region of the cemented interface almost invariably differ markedly from the elastic properties within the material of the individual plates.

Ceramic bodies suitable for inclusion in the electromechanical transducer device of the present invention may have a variety of unconventional shapes, and several methods for producing such shapes will be suggested hereinbelow. In the form illustrated in Figs. 1 and 2, each of the spaced holes 14–19 extending through the dielectric material is seen to be generally circular in cross-section.

The masses of material between and to the sides of the holes 14–19 were characterized hereinabove as laterally separated from each other by the holes. In the body 11, as shown in Figs. 1 and 2, the holes 14–19 extend longitudinally of the body, so that the lateral direction across the holes separating the masses of ceramic material is a width direction within the body 11. However, it will be understood that any direction within the body in the plane of its width and length directions may be characterized as a lateral direction, as distinguished from the thickness direction of the body. Thus, if the body 11 were quite short in the direction of the holes 14–19, the overall dimension across the holes might be even greater than the dimension along the holes, in which case the lateral direction between the holes would be the length direction. Several possibilities for the direction of lateral separation between the connecting masses of material in the central thickness portion of the body may be appreciated by reference, for example, to the arrangements shown in Figs. 4 and 6, which will be discussed hereinbelow.

Referring again to Fig. 2, electrodes are seen to be disposed individually on each outer surface of the two outer thickness portions 12 and 13 and on portions of the inner surfaces thereof not replaced by the laterally separated connecting masses between the holes 14–19. If the outer thickness portions, above and below the row of holes, are considered separately from the connecting masses located laterally of the holes, it will be understood that some parts of the inner surfaces of these outer portions may be considered to be replaced or covered by the connecting masses between the holes, although, of course, the inner surfaces are not evident as surfaces or interfaces in the noncomposite fired body at the points where they are joined to, and replaced by, the connecting masses. However, the upper and lower internal surfaces within the holes 14–19 are surfaces which are not replaced by the connecting masses of material between the holes, so that these internal surfaces may be thought of as inner surfaces of the outer thickness portions. In the case illustrated the electrodes designated to be disposed on portions of the inner surfaces are, of course, on the inner surfaces of the holes 14–19. Accordingly the several electrodes may be referred to as the individual outer electrodes 22 and 23, disposed individually on the outer surfaces of the outer thickness portions 12 and 13 respectively, and inner electrode portions disposed on the surfaces of the holes. These inner electrode portions are designated collectively by the reference numeral 24, it being understood that there is one such electrode portion in each of the six holes 14–19.

The outer electrodes 22 and 23 are insulated from each other by the edge portions of the body 11. Ordinarily it is conventient for the electrodes 22 and 23 to extend to the highly curved edges of the body. In practice these electrodes may be applied to the ceramic body in the form of a thick suspension of small conductive particles, such as carbonaceous particles or metallic silver particles. A conductive binder may be included in the suspension, which may be applied to the upper and lower surfaces of the body 11 by means of a roller or sequeegee. If the roller is wider than the body 11, the width of the application of the electrode material is limited by the curvature at the edges of the body, by the elasticity of the roller material, and by the pressure of application thereof to the body. The holes 14–19 preferably are of capillary diameter, so that a conductive suspension similar to that used for the outer electrodes, if not too viscous, may be introduced into the holes by capillary action. This internal electroding operation can be carried out successfully with remarkable ease and speed.

Thereafter all of the electrodes 22, 23, and 24 may be baked to remove the liquid suspending medium and leave a thin, conductive layer adhering to the electroded surface. The thickness of the various electrode layers may be considered to be exaggerated in Fig. 2 for convenience of illustration. Whether or not an opening remains in each hole, within the electrode portions 24, depends upon the diameter of the holes before application of electrode material and upon the nature of the electrode material and the method of its application. In Fig. 2 the electrodes 24 are shown as thin coverings over surfaces of the holes, leaving a central space. In Fig. 1, however, the electrodes 24 are shown as filling the holes, and such electrodes may be of solid metallic conductive material completely filling the holes. Alternatively, if desired, the central spaces within the electrodes 24, as shown in Fig. 2, may be filled with a different conductive or nonconductive material. However, in spite of the presence of electrode materials and possibly other materials within the holes, it will be convenient to consider the ceramic surfaces forming the sides of the holes 14–19 as the lateral edges of the connecting masses of ceramic material between the holes; these surfaces will be referred to hereinbelow as laterally exposed interior surfaces, even though these lateral surfaces actually are covered by the electrode material so that the ceramic surface is not exposed to view upon optical examination.

Mechanical means is coupled to the body 11 so that motion of this means is associated with bending of outer surface elements of the body. To enable such bending to take place the body 11 is shown in Fig. 1 as supported at the rear of the body by a bracket 28 having a sleeve portion 29 within which one end of the body 11 is affixed or cemented. The free end of the body is fitted similarly with a sleeve 31 to which is secured a rod or stylus 32 constituting the aforementioned mechanical means. If the sleeves 29 and 31 are of a conductive material, a margin is left at each end of the element between the respective sleeve and each of the electrodes 22 and 23.

It will be noted that vertical motion, in the direction of the double-ended arrow in Fig. 1, of the stylus 32 coupled mechanically to the body 11 causes bending of the hypothetical outer surface elements running longitudinally along the body in the upper and lower surfaces thereof. Thus, when the stylus 32 is pressed downwardly, these upper and lower surface elements of the body become convex as viewed from above the body 11, while upward motion of the stylus 32 corresponds to a concave bending of these surface elements as viewed from above. In the device of Fig. 1 such motion of the stylus 32 is associated with bending of the body 11 about an axis generally parallel to the outer surfaces of the body and generally perpendicular to the holes 14–19, so that the axes of the holes themselves bend.

Satisfactory operation of the bending-responsive device of the present invention depends upon adequate polarization of the electromechanically sensitive ceramic material of the body 11. The electrodes 22, 23, and 24 are adapted to carry unidirectional electric potentials corresponding to polarizing fields directed in opposite thickness directions in the two outer thickness portions 12 and 13. The outer electrodes 22 and 23 are shown in Figs. 1 and 2 connected to respective terminals 33 and 34. The inner electrode portions 24 in the holes 14–19 are interconnected, for example by a strip of the electroding material running along one end of the body 11, and are wired to one of the points of a three pole, single throw switch 36 shown in Fig. 1. The other point on this pole of the switch is connected to one terminal of each of two sources of a high unidirectional potential in the form of batteries 37 and 38. The other terminals of these two batteries have the same polarity but are connected to respective points of the other two poles of the switch 36 through isolating resistors 39 and 41 respectively. The remaining points on the latter two poles of the switch 36 are connected individually to the terminals 33 and 34.

When the switch 36 is in the closed positions as shown in Fig. 1, a D.-C. potential of one polarity is applied to the inner electrode portions 24 from both batteries 37 and 38, while a D.-C. potential of the other polarity is applied through the resistors 39 and 41 to both of the outer electrodes 22 and 23. In the ordinary case the same polarizing field strength will be desired in the two outer thickness portions of the body 11; since these thickness portions ordinarily have the same thickness dimension, the same polarizing potential thereacross produces the same field strength. This may be accomplished alternatively by omitting the battery 38 and connecting one terminal of the battery 37 to the isolating resistor 41 as well as to the resistor 39. If the batteries are assumed to apply a positive potential to the outer electrodes through the isolating resistors, then, with reference to Fig. 2, the polarizing fields may be taken to be directed in the downward thickness direction in the upper thickness portion 12 but in the upward thickness direction in the lower thickness portion 13. Thus it appears that the polarizing fields in the two thickness portions are oppositely directed.

The highest electromechanical responses ordinarily are obtainable when the polarizing potentials are maintained continuously across the several thickness portions of the body 11. However, it very frequently is convenient to make use of remanent polarization of the ceramic material of the body. In this case the switch 36 may be opened after a suitable polarizing period, which may be no more than five or ten minutes. Alternatively, better polarization often may be obtained by heating the transducer body to elevated temperatures with the polarizing potentials left applied while the body cools toward room temperature. If desired, of course, the connections from the inner electrode portions 26 then may be completely broken and the source of polarizing potentials separated from the transducer device for use in polarizing other transducer bodies. Since the maintenance of connections to inner electrodes during operation of the device in the field may constitute a serious mechanical problem, involving the provision of mechanically strong leads from a number of small internal electrodes, it ordinarily is advantageous to eliminate any leads from the central electrodes after the initial polarization. Thereafter, unless the body 11 is subjected to unusually high electric fields or temperatures, the two thickness portions 12 and 13 of the body have substantial remanent polarization of the type obtainable by applying to the electrodes 22, 23, and 24 the unidirectional electric polarizing potentials corresponding to fields in the thickness directions, as described hereinabove.

Operation of the transducer device represented in Figs. 1 and 2 may be illustrated by describing the electrical response to the application of vertically directed mechanical signal forces at the end of the stylus 32. The bending of outer surface elements, resulting from the application of these forces as discussed hereinabove, involves at a given instant lateral contraction and expansion respectively of one and the other of the two outer thickness portions 12 and 13, as constrained by the laterally separating connecting masses which are located between the two outer portions in the central thickness portion 21 of the body 11. Thus, when the stylus 32 is moved vertically downward as viewed in Fig. 1, the lower surface elements are bent to produce a concave curvature in the lower surface, which, of course, involves a contraction in a lateral direction, specifically the length direction, within the lower thickness portion 13. Simultaneously, the upper surface assumes a convex curvature involving a lateral or longitudinal expansion within the upper thickness portion 12. The connecting masses of the central thickness portion constrain the two outer thickness portions through the development of shear strains within the connecting masses.

Polarized, electromechanically sensitive, ceramic dielectric materials in general exhibit an electromechanical response to contraction and expansion in a direction normal to the direction of the polarizing field by developing electric signal fields and corresponding signal potentials in the polarization direction. This response may be called the transverse response, because the mechanical strains are at right angles to the electric fields, and the signal field developed in a given portion of polarized material has one polarity or the other, depending on whether the mechanically imposed strains are contractive or expansive strains. By virtue of the transverse response, the contraction and expansion in the lower and upper thickness portions 13 and 12 respectively of the body 11 is electromechanically coupled with electric signal fields in these two thickness portions of the body when the electromechanically sensitive material is conditioned by the oppositely directed polarizing fields. The electrodes 22 and 23 on the outer surfaces of the body are adapted to carry electric signal potentials corresponding to electric signal fields directed at a given instant in the same thickness direction in the two thickness portions 12 and 13. The signal fields simply are short-circuited around the inner electrode portions 24. Since the thickness portions 12 and 13 are polarized in opposite directions, while the mechanical stresses are also in opposite senses in the two portions, the resulting signal fields in the two portions are in the same direction. Thus if the signal field is directed downwardly, as viewed in Fig. 2, from the upper electrode 22 to the central thickness portion of the body, the same field occurs, also directed downwardly, from the central thickness portion to the lower electrode 23. The resulting signal potentials appear across the terminals 33 and 34 and are of one polarity when the stylus 32 is depressed downwardly. The signal field in both outer thickness portions, as well as the polarity of the potential developed across the signal terminals, is of the other polarity during a portion of the signal cycle when the stylus 32 is moved upwardly, since the strain changes from expansive to contractive in the thickness portion 12 at the same time that it changes from contractive to expansive in the oppositely polarized portion 13.

These electric signal potentials appearing between the terminal 33 and the grounded terminal 34 may be coupled through a blocking capacitor 42 and a single pole, double throw switch 43 to the input circuit of an amplifier 44, as illustrated in Fig. 1. If the switch 36 remains closed during operation, the polarizing batteries 37 and 38 remain connected through the isolating resistors 39 and 41. The voltage drop through these large resistances is negligible in view of the very small current drawn for polarizing, this current being practically zero under ordinary conditions after the initial polarization. The isolating resistors prevent short-circuiting of the terminals 33 and 34 through the batteries, and the capacitor 32 prevents application of the polarizing potential to the amplifier 44. If the polarizing circuits are removed physically, or by opening the switch 36, the capacitor 42 may be omitted. Assuming that the stylus 32 is actuated by permitting the stylus point to ride in the vertically modulated groove of a recording disk of the so-called hill and dale type, not shown, the audio signals, transduced to the form of electric signal fields, are applied from the terminals 33 and 34 through the capacitor 42 to the amplifier 44, wherein they may be amplified for application to a loud-speaker 46 to effect audible reproduction of the recorded signals.

If operation as a recording device rather than as a reproducing device is desired, electric signals corresponding to audible compressional vibrations in the atmosphere may be permitted to impinge on a microphone 47, which is coupled to the input circuit of another amplifier 48. When the switch 43 is thrown to the position indicated in the dotted lines in Fig. 1, the amplified electric signals are coupled from the output circuit of the amplifier 48 through the switch 43 and the capacitor 42 to produce electric signal potentials across the signal terminals 33 and 34, whence these potentials are applied in series across both outer thickness portions 12 and 13 of the transducer body 11. The resulting electric signal fields are directed at a given instant in the same thickness direction in the two thickness portions 12 and 13, which, being oppositely polarized, develop individually contraction and expansion at a given instant. This transducing from electrical to mechanical energy is brought about by the well-known converse electromechanical response of the electromechanically sensitive ceramic material. As a result the outer surface elements of the body bend so as to produce an upward or downward motion of the stylus 32, depending on the instantaneous polarity of the applied signal, thus effecting recording of the audio signals in a recording medium, not shown, being drawn along in contact with the stylus point.

Figure 3:
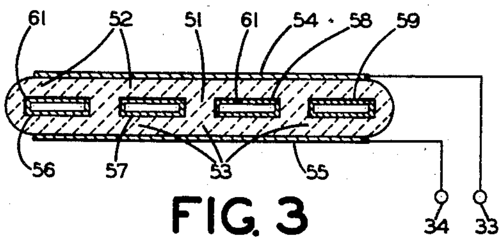
Fig. 3 is a cross-sectional view of an alternative transducer element in a modified embodiment of the invention otherwise similar to that illustrated in Fig. 1.

Referring now to Fig. 3, there is shown in a sectional elevation, similar to the sectional view of Fig. 2, a polycrystalline transducer body and its electrodes, constituting an alternative form of the body for incorporation in the transducer device of Fig. 1. Except for the somewhat different over-all shape of the body 51 illustrated in Fig. 3 and for the different configuration of the holes passing therethrough, the body 51 having the sectional configuration shown in Fig. 3 may be incorporated in the identical equipment illustrated in Fig. 1. The body 51 has upper and lower outer thickness portions 52 and 53 respectively and upper and lower outer electrodes 54 and 55 respectively. Instead of six circular holes, however, the body 51 has four longitudinally extending holes 56, 57, 58, and 59, each of which has an inner electrode portion, and these inner electrode portions are indicated collectively by the reference numeral 61. For purposes of polarization the inner electrode portions 61 are interconnected and also connected to the polarizing sources 37 and 38 of Fig. 1 through one pole of the switch 36. The outer electrodes 54 and 55 are connected to the terminals 33 and 34 in the same manner as the outer electrodes 22 and 23 of the body 11 illustrated in Fig. 2. The polarization and operation of the Fig. 1 device with the body 51 of Fig. 3 incorporated therein is entirely analogous to the polarization and the operation with the body 11 of Fig. 2.

It has been stated hereinabove that the polarizing fields in the body 11 are directed in opposite thickness directions in the two thickness portions 12 and 13. The same statement applies to the two thickness portions 52 and 53 of the body 51 illustrated in Fig. 3. It will be understood, however, that the polarizing fields have some components in a lateral direction, in these cases a width direction, particularly in the regions near vertical planes lying midway between adjacent pairs of the holes 14–19 or 56–59. A rough idea of the direction of the polarizing fields may be obtained by plotting electrostatic flux lines between the outer electrodes and the inner electrode portions. Since such flux lines emanate from the circular electrode portions 24, or from the small, laterally exposed vertical sides of the inner electrode portion 61, in directions normal to the inner electroded surfaces, it will be clear that the polarizing fields in the regions just mentioned between inner electrode portions have substantial laterally directed components. Notwithstanding this fact, however, large polarizing field components are developed in the thickness directions, especially near the outer surfaces of the bodies where the bending deformations are associated with the most highly concentrated contractive and expansive stresses. It is these effective components of the polarizing fields in the thickness direction which are contemplated by the phraseology of oppositely directed polarizing fields. In fact, the fringing effects which give rise to lateral fields at some points within the transducer body also are effective to provide very substantial thickness polarization, and hence efficient energy-transducing, near the surface portions of the body, even when the holes are spaced rather widely apart, as will appear from a discussion of hole separation hereinbelow.

Figure 4:
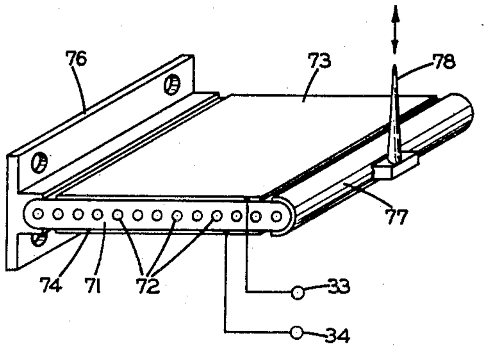
Fig. 4 is a perspective view of another embodiment of the transducer device of the invention.

Another embodiment of the transducer device of the invention is illustrated in perspective view in Fig. 4. In this view a body 71 of electromechanically sensitive ceramic dielectric material is shown with numerous holes 72 passing through the body in one lateral direction. Outer electrodes 73 and 74 are provided on the upper and lower external surfaces respectively of the body 71, and the holes 72 are filled with conductive electrode material. A mounting bracket 76 and a driving cap 77 are secured to the body 71 at opposite ends or sides thereof. The brackets 76 and 77 extend in a lateral direction parallel to the holes 72. Mechanical means in the form of a stylus 78 is coupled to the body through the cap 77 so that motion of the stylus 78 in vertical directions, as indicated by the double-ended arrow, is associated with bending of outer surface elements of the body 71. These surface elements are considered as running in the surface portions of the body in a direction transverse to the direction of the holes 72 through the body, so that with the Fig. 4 arrangements the holes themselves do not bend as they do in the arrangements of Figs. 1–3.

Nevertheless, it will be seen that the bending of the body 71, associated with vertical motion of the stylus 78, does involve at a given instant lateral contraction and expansion individually of the upper and lower thickness portions of the body 71, these contractive and expansive strains being in directions perpendicular to the direction of the axes of the holes 72. The body 71 is conditioned by the application thereacross of polarizing potentials, exactly as with the body 11 of Figs. 1 and 2. The aforementioned contraction and expansion are associated in turn with electric signal fields directed at a given instant in the same thickness direction throughout the body 71, and corresponding electric signal potentials appear across the terminals 33 and 34 connected to the outer electrodes 73 and 74 respectively. Thus the electroded body 71 of Fig. 4 transduces between electrical and mechanical energy in a manner quite similar to the manner of operation of the Fig. 1 device. It will be appreciated that the mechanical compliance of the Fig. 4 arrangement and the stress distribution within the body 71 during bending are somewhat different from those obtained with the Fig. 1 arrangement. This is the case not only because of the different shape of the body 71 and the different number of holes 72, but also because the laterally separated masses of the ceramic material disposed laterally of the holes 72 serve to constrain the upper and lower thickness portions of the body 71 through the action of shear strains corresponding to mechanical couples developed in directions at right angles to the holes 72, while in the Fig. 1 device the shear strains in the central thickness portion 21 of the body 11 result from mechanical couples developed in the direction of the holes 14–19.

Figure 5:
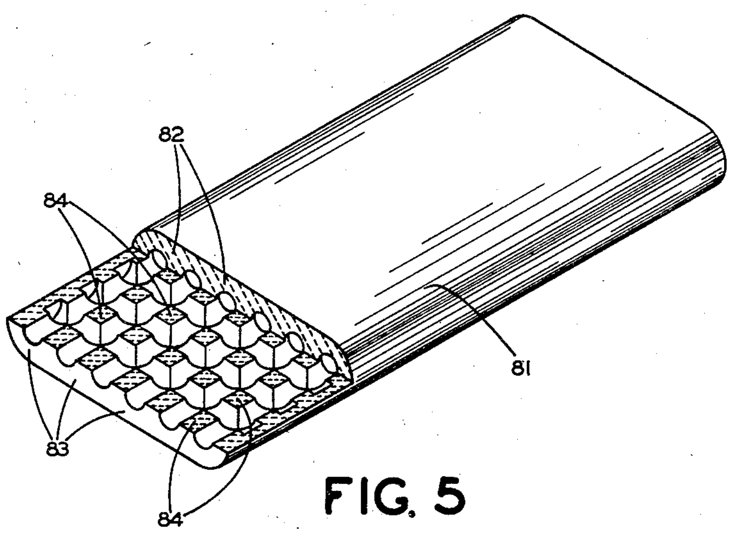
Figs. 5 and 6 are perspective views respectively of two additional forms which the transducer body may take in the bending-responsive device of the invention.

In each of the forms of the transducer device illustrated in Figs. 2, 3, and 4, the ceramic body has parallel spaced holes extending through the central thickness portion of the dielectric material. The laterally spaced masses of ceramic material making up the central thickness portion are the regions of the body disposed laterally of these holes. In Fig. 5, however, there is illustrated a different arrangement of the laterally separated connecting masses.

The body 81 shown in Fig. 5 also has upper and lower thickness portions, and further may be viewed as having six longitudinally extending holes. However, as seen in the end portion of the body 81 which is cut away along a central plane in the perspective view of Fig. 5, these longitudinally extending holes are intersected by another set of holes running in the width direction and similarly spaced from each other. The latter set of holes in the body 81, as illustrated, does not extend through the outer side walls. The structure of the body 81 may be viewed as comprising the upper and lower thickness portions 82 and 83 respectively, joined into one body by at least several laterally spaced posts of the same ceramic material connecting the two thickness portions 82 and 83, the entire structure being ceramically bonded throughout. These posts are designated collectively by the reference numeral 84.

Figure 6:
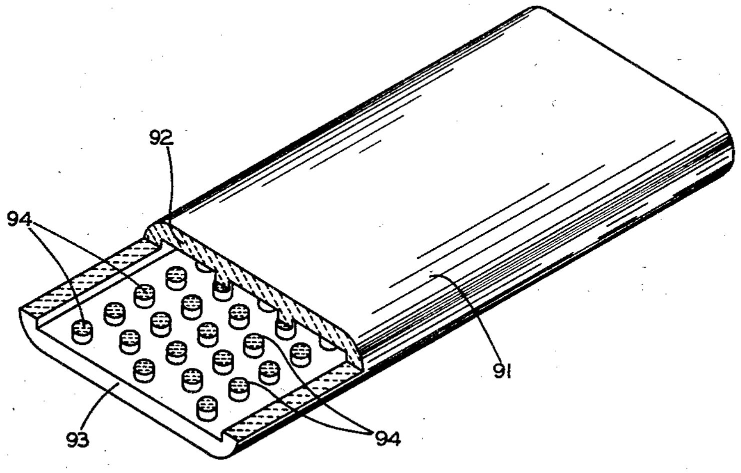

In Fig. 6 there is shown, also in perspective view with the upper thickness portion cut away at one end, another body 91 of structure resembling that of the body 81 shown in Fig. 5. Again, upper and lower thickness portions 92 and 93 respectively may be seen in Fig. 6, these portions being connected by a large number of regularly distributed, laterally separated circular posts 94. It will be understood that the outer surfaces of the outer thickness portions 82 and 83 in the body 81, shown in Fig. 5, as well as the outer surfaces of the outer thickness portions 92 and 93 of the body 91 shown in Fig. 6, are to be provided with individual outer electrodes, not shown in the drawings. Similarly, the internal spaces or openings between these outer thickness portions, specifically the internal spaces formed on all sides of the posts 84 and 94, are provided with inner electrodes, not shown, including conductive layers on the horizontal portions of the inner surfaces of the outer thickness portions not replaced by the posts 84 or 94. These inner electrode portions may be formed over all internal surfaces by introducing a suspension of finely powdered graphite or other conductive material into the interior spaces by capillary action or otherwise, then drying and baking.

It will be apparent that after application of electrodes either of the bodies 81 or 91, illustrated in Figs. 5 and 6, may be mounted as in Fig. 1 in place of the body 11 for operation in a bending mode. During operation when so mounted polarizing and signal fields are developed in the upper and lower thickness portions in a manner quite analogous to that obtained with the transducer bodies illustrated in Figs. 2, 3, and 4. Likewise, bending of the body 81 or 91 involves at a given instant lateral contraction and expansion respectively of one and the other of the two outer thickness portions 82, 83 or 92, 93 as constrained by the posts 84 or 94, as the case may be. Thus signal fields appear in the same thickness direction throughout the body 81 or 91, and transducing takes place in a manner similar to that described hereinabove with reference to Figs. 1–4. It may be noted, however, that the constraint imposed by the posts 84 or 94 between the respective outer portions of the transducer body operates in a similar fashion in all lateral directions due to the systematic distribution of the numerous posts, so that the distinctions with regard to the orientation of the axis of bending, brought out hereinabove in comparing the arrangements of Figs. 1 and 4, do not apply with the same force when the body 81 or 91 of Fig. 5 or Fig. 6 is substituted in the device. It will be understood that, when the connecting masses of material between the outer thickness portions have the shape of posts rather than of elongated masses disposed between long parallel holes, the separate posts should be provided in greater number than is the case with more elongated connecting masses. The posts should be sufficiently numerous and mutually spaced sufficiently closely effectively to couple together mechanically all opposed areas of the two outer thickness portions by shear in the posts, whereby the bending motion involves lateral expansion and contraction to the fullest possible extent in all regions of the two outer thickness portions. The maximum post spacing consonant with most efficient operation will be discussed further hereinbelow.

Numerous variations of the fundamental structure, contemplated in accordance with the present invention for the ceramic body of the transducer device, will be apparent to those skilled in the electromechanical transducer field. For example, the curved side walls extending the length of the bodies 81 and 91 as shown in Figs. 5 and 6 may be removed, as by grinding, without substantial impairment of the operation, since the posts 84 and 94 serve by themselves to couple the upper and lower thickness portions. One additional example, based on the structures discussed hereinabove, may be mentioned. Thus, a body such as the body 71 shown in Fig. 4, or alternatively such as the body 81 or the body 91 shown in Figs. 5 and 6, may be altered in shape by constructing on an outer surface of such body a circle, inscribed within the width limits of the outer surface, and grinding away or otherwise removing the material outside of the lateral limits of this circle. This operation produces a disk-shaped body having the aforementioned outer thickness portions with connecting masses therebetween. However, in the case of the disk made from the body 71, the holes 72 will be longest across one diameter of the disk and shortest near the arcuate portions of the disk farthest removed from this diameter. On the other hand, a disk cut from the body 81 or 91 will have posts distributed more or less regularly between the two outer portions. Any one of such disks may be supported mechanically around the circular edge thereof, and mechanical means may be coupled to the surfaces of the disk at the center thereof so that motion of this mechanical coupling means in directions normal to the outer surfaces involves cup-shaped deformations of the disk. Such deformations cause bending of all the radial outer surface elements of the disk which extend in all directions from its center, and contraction or expansion occurs in all lateral directions within the material of the disk. Polarizing and signal fields are developed as in the other cases discussed hereinabove.

In each of the embodiments illustrated in the drawings, it will be noted that the upper and lower thickness portions of the transducer body have thickness dimensions, as measured at the thinnest regions thereof near the holes, which are substantially equal. That is to say, the thickness dimensions on each side of the connecting masses are substantially equal. This is the condition for mechanical symmetry of the elastic deformations of the body, and is the preferred, although not the only, form which these bodies may take in the device of the invention.

Another variation of the shape of any of these bodies may be obtained by varying the interior thickness dimension, as measured between the two outer thickness portions having the aforesaid thickness dimensions. In the usual case the ceramic material forming the connecting masses between the two outer thickness portions is not utilized at all efficiently as transducing material during operation of the device but serves primarily structural or mechanical purposes. Indeed, the central plane through the ceramic body, being intermediate between the portions which contract and the portions which expand, suffers neither type of distortion. For this reason the removal or omission of some of the material in the central thickness regions need not impair the over-all response, and even may improve it since the remaining material is more highly stressed on the average because of its greater average distance from the central or neutral plane of bending. An added advantage of the interior holes or openings is that, when the interior surfaces are more or less completely electroded, the capacitance measured between the two outer electrodes is substantially increased due to the effective decrease in thickness of the dielectric material between the outer electrodes. However, the portions of material near the central plane do make some contribution to the net electromechanical response. If the thickness of the interior holes is made very great relative to the over-all thickness, this material near the central plane, which is imperfectly polarized due to the resulting electrode configuration, will be inefficiently used with a tendency toward impairment of the net response. Moreover, too great hole thickness seriously weakens the structure of the transducer body. Thus, for efficient utilization of the material along with adequate mechanical strength, it is preferred that the interior thickness dimension be kept between about one quarter and one half of the over-all thickness dimension of the body.

The optimum proportioning of the thickness dimensions of the body among the outer and inner thickness portions has just been discussed. However, the shape and proportioning of the body in directions laterally of the thickness direction may have an even more critical effect upon the performance of the bender device. Several factors to be considered in proportioning of the lateral dimensions of the ceramic connecting masses in the body and of the holes therebetween will be discussed hereinbelow.

In considering the electromechanical response of devices utilizing dielectric elements of electromechanically sensitive material it is convenient to define an electromechanical coupling factor $k$ by the following equation:

$$k^2 = N^2C_e/(N^2C_e + C_m)$$

In this equation N is the transducer ratio and is measured by applying a predetermined force to the mechanical system of the transducer to produce a mechanical deformation of the transducer body in the required bending mode or other mode of motion. The resulting electrical potential produced across the open-circuited transducer electrodes determines the value of N in terms of volts produced per newton applied force. The value of $C_e$ is determined by measuring the capacitance in farads across the transducer electrodes without any mechanical constraint on the transducer; this measurement should be made at low frequencies and in particular at frequencies well below the lowest natural mechanical resonance frequency of the transducer assembly. The term $C_m$ represents the mechanical compliance of the transducer and is determined in terms of the resulting motion, in meters, per newton of force applied to produce mechanical deformation of the transducer in the desired mode of motion; the compliance is measured with the transducer electrodes open-circuited.

It may be noted that the formula by which the coupling factor $k$ is defined may be derived from a hypothetical equivalent circuit including a transformer having a turns ratio equivalent to the transducer ratio N. The electrical parameters of the transducer device are represented in circuit with one winding of this transformer, while the mechanical parameters may be represented in circuit with the other winding in the form of equivalent electrical parameters. Thus, the capacitance $C_e$ is in series with the winding of the transformer on the electrical side of the circuit, while the compliance term $C_m$ appears as an equivalent capacitance in shunt with the mechanical side of the equivalent circuit. The complete equivalent circuit also includes a mass M which may be represented on the mechanical side of the equivalent circuit by an equivalent inductance connected in series with the transformer winding and with the compliance $C_m$. However, all measurements are made at frequencies which are well below the lowest frequency of natural mechanical resonance, at which the equivalent circuit reactances $C_m$ and M resonate. The value of M is entirely negligible under these conditions of measurement and has been omitted from the equation defining $k$. It is noted further that the defining equation in the form shown above gives an expression for the square of the coupling factor. This value of $k^2$ has a physical significance by itself and is a figure of merit for the performance of an electromechanical transducer.

Considering for purposes of comparison a two plate ceramic bender of conventional construction, that is, two polarized ceramic plates with a major face of one plate cemented to a major face of the other plate and electroded for electric fields in the thickness direction, the coupling factor may be computed for the ideal case. The computation is based on the measured mechanical response coefficient of the ceramic material when subjected to electrical polarizing and signal potentials in one direction to produce mechanical strains in a direction transverse thereto, and the computation takes into account the fact that the mechanical strains are zero at the cemented interface between the plates during bending and increase to maxima at the outer surfaces. Using representative values for the transducing coefficient, dielectric constant or permittivity, and Young's modulus, a theoretical limit of about 0.165 or 16.5% is found for the two plate ceramic bender. However, determinations of the coupling factor from the formula given above, using actual measured values of transducer ratio, capacitance, and compliance of the individual bending devices, seldom gives values of the coupling factor above 13%, and a good average value is about 12%. Measurements also have been made of the coupling factor for a tubular ceramic element of flattened cross-sectional shape having a single, wide, but thin hole through the element, as described in the aforementioned Williams patent. Such a tube may be electroded on the two flattened external surfaces and within the hole, polarized in thickness directions, and driven mechanically so as to bend the axis of the hole. The resulting signal potentials have been found to correspond to coupling factors which average about 13.5%, indicating somewhat better performance than with the more conventional two plate structure. While these tubes have very useful properties, their fabrication and use tend to present somewhat greater problems, due to limitations in mechanical strength, than is the case with the two plate structure.

It has been found that the device of the present invention may be manufactured by practical methods to give a coupling factor approaching more closely the theoretical limit of about 16.5%. Thus, transducers such as that illustrated in Figs. 1 and 2 have been made giving coupling factors well over 16%, and most determinations of the coupling factor obtained with these devices give values of at least 15%. Hence it would appear that from a practical point of view performance of these devices is substantially better than that of other devices utilizing two opposed expander plates, provided with electrodes for fields in the thickness direction, and mechanically coupled together to provide a response in a bending mode.

If optimum response is to be obtained, however, certain limitations in the dimensions of the transducer body must be observed. Thus, neither the connecting masses between the outer thickness portions nor the holes between these connecting masses should have too great a width. If the connecting masses are too wide, the polarizing fields will have too small a vertical component in the regions directly over and under the connecting masses. On the other hand, if the holes are too wide, the connecting masses will not be able to couple the two outer thickness portions of the body so as to provide optimum contractive and expansive strains throughout these thickness portions during bending, and the coupling factor tends to be lowered as much as 2%. Perhaps an even more important advantage, obtained when the holes are relatively narrow and a sufficient number of connecting masses is provided, lies in the added mechanical strength obtained; this added strength is important both during handling of the green ceramic body and during assembly and use of the finished transducer device.

Considering the dimensions of the holes in the central thickness portion of the body, a practical limitation, as applied to holes having the same width at all regions, requires that this width be less than half of the over-all width dimension of the body. As applied generally to any configuration of connecting masses and internal spaces therebetween, the statement of this limitation in the lateral dimensions of the holes becomes somewhat more complicated. Stated for application to any configuration, the lateral distance between any point on a laterally exposed internal surface of any of the connecting masses and the closest adjacent laterally exposed surface of another of the connecting masses should be less than half of the over-all width dimension of the body. For the configurations shown in Figs. 2 and 4, this lateral distance may be taken as the diameter of the holes, while in Fig. 3 it is the horizontal width of the holes. As applied to the structure of Fig. 6, the lateral distance under discussion is the distance from any point on a side of a post 94 to the nearest side of another post or of the internal edges extending longitudinally along both sides of the body. This same requirement as applied to Fig. 6 means that no point on the last-mentioned internal surfaces running along each side of the element should be more distant from the nearest post 94 than half of the over-all dimension. Similar measurements can be made on the body illustrated in Fig. 5 to determine whether or not the spaces between the posts 84 are narrow enough to come within the limitation. It will be seen that all of the bodies illustrated in Figs. 2–6 come well within this limitation.

The limitation just discussed is intended to insure adequate coupling through the connecting masses between the outer thickness portions of the body. When the width of each hole or internal space between posts is limited to less than half of the over-all width, there can be no large proportion of the outer thickness portions of the body which is relatively weakly deformed due to incomplete coupling or constraint between the two outer portions.

However, when the over-all width of the body is quite large relative to the over-all thickness, observance of the limitation just discussed still may permit the width of the holes to be too large to provide mechanical support between the two outer thickness portions to the extent adequate for ease of handling before, during, and after the ceramic-firing operation. It is desirable that the wall thicknesses be large enough compared to the width of the holes, or conversely that the holes be narrow enough compared to the thickness of the portions above and below the holes, so that no extraordinary precautions need be taken before and during the ceramic-firing operation to prevent sagging and collapsing of the walls adjacent to the holes. Furthermore, if the holes are too wide for adequate mechanical strength after firing, breakage may tend to occur during assembly of the mechanical means, including the mounting and drive brackets or sleeves, thus giving rise to excessive fabrication expenses. Moreover, if the holes are too wide relative to the wall thicknesses above and below them, these walls tend to distort in operation during mechanical bending, which then may leave unduly concentrated mechanical stresses in regions near the connecting masses of ceramic with resulting tendency toward destruction of the body by fracture.

When a hole or other internal space in a ceramic body is increased in width much beyond a width equal to the adjacent wall thickness of the body, some precautions must be taken during fabrication to prevent permanent distortion of the body wall. Simple precautions, such as the inclusion of a little binder material in the green body and careful handling and staggering of the ware during the firing operation, make possible the quantity production of shapes having internal openings considerably wider than the thickness of the walls spanning the openings, but such precautions are not adequate for very wide holes. Experience has indicated that reasonable care during fabrication of any of the shapes under consideration, including that illustrated in Fig. 3 of the drawings, permits successful use of practical fabrication techniques when the width of the holes is kept less than about five times the wall thickness above or below the hole. This limitation may be generalized to cover the cases illustrated in Fig. 6, as well as in Fig. 3 and the other figures of the drawings, by referring again to the lateral distance between any point on an interior laterally exposed surface of any of the connecting masses and the closest adjacent laterally exposed surface of another of the connecting masses. This distance, wherever measured, should be less than about five times the smaller of the thickness dimensions of the two outer thickness portions. When this limitation is observed, not only are fabrication difficulties largely avoided, but also extraordinary precautions need not be taken to prevent breakage during assembly and use of the body in the transducer device.

When the limitations discussed hereinabove regarding the maximum lateral dimension of the internal holes or openings are observed, there are advantages in making the lateral or width dimension of the holes or openings greater than the thickness dimension thereof. Thus the Fig. 3 configuration tends to give better polarization and higher capacitance than the Fig. 2 arrangement if the spacing between adjacent holes is the same in each case. It will be understood that the laterally exposed portions of the holes may be rounded in the Fig. 3 configuration to avoid undesirable local stress conditions. Thus, each of the holes in Fig. 3 advantageously is generally rectangular with its cross-sectional width at least twice as great as the thickness of the central thickness portion of the body 51, but this cross-sectional side should be less than about five times the smaller of the substantial thickness dimensions of the two outer thickness portions 52 and 53.

It was mentioned above that, if the connecting masses are too wide, potentially useful material in the outer thickness portions will contribute very little to the net electromechanical response, due to insufficient polarization. Thus, it is not sufficient to limit the width of the several holes in the central portion of the body merely by providing very extensive connecting portions between the holes. For the most efficient utilization of all of the ceramic material the polarization would have to be in a thickness direction at all points. To achieve this ideal condition, no point on an outer electroded surface could be separated from an inner electrode portion by a distance greater than the thickness dimension of the intervening thickness portion of the body. This ideal separation between the outer and inner polarizing electrodes is obtained in the Fig. 3 arrangement, for example, only in the regions immediately above and below each of the holes. However, if in the view of Fig. 3 a vertical line is constructed midway between the holes 56 and 57, for example, the points where this line meets the upper and lower electrodes 54 and 55 are seen to be separated from the corners of the electrodes 61 within these holes by a distance substantially greater than the thickness dimension directly above or below a hole. This distance obviously is measured obliquely of the thickness direction and is a measure of the deviation of the polarization direction in some portions of the transducer body from the ideal thickness direction. The greater this distance between outer and inner electrodes, the more deviation there is in the regions of such greater distance from an optimum condition of thickness-directed polarization.

To determine the importance of the maximum distance from an outer electrode to an inner electrode portion, three groups of bender bodies having a shape similar to that illustrated in Fig. 2 were made and tested. In group 1 all six of the holes 14–19 were electroded, and the material between these inner electrodes and the outer electrodes was conditioned by polarization, using an arrangement of the type illustrated in Fig. 1. In this case the maximum or critical distance from outer to inner electrodes was determined by locating the points where a perpendicular bisector between two adjacent holes intersects an outer surface and measuring the distance from this point of intersection to one of these circular holes in the direction of a radious of that hole. In group 2 only the four consecutive holes 15–18 were connected to the polarizing source, while in group 3 only the two centrally located holes 16 and 17 were used. In these cases, referring to Fig. 2, the critical distance may be taken as the distance between the left hand edge of an outer electrode 22 and the nearest electroded hole 15 or 16. The critical distance for groups 1, 2, and 3 was respectively 1.2, 1.7, and 3.0 times the thickness dimension measured directly between a hole and an outer surface. The corresponding coupling factors had average values of 15.8%, 14.2%, and 10.8% respectively.

A plot can be made to demonstrate the relationship between critical distance ratio and the coupling factor. For convenience of interpretation the inverse distance ratios, that is, the reciprocals of the ratios 1.2, 1.7, and 3.0, may be used, and the square rather than the first power of the coupling factor should be plotted. In addition to the three points utilizing the coupling factors found for groups 1, 2, and 3, the coupling factors for the extreme distance ratios may be included. Thus, when there are points on an outer electroded surface which are very greatly removed from the nearest inner electrode portion, the inverse distance ratio approaches zero; in such a case practically none of the transducer body has the desired thickness polarization, and the transducer ratio and hence the coupling factor may be taken to be zero. Under the ideal bender case, on the other hand, the polarization is thickness-directed at all points, so that the distance ratio is unity while the coupling factor may be taken to have the approximate ideal value of 16.5%.

When the three measured and the two extreme coupling factors are squared and plotted on linear coordinate paper against the inverse distance ratio, the plot approximates two straight lines intersecting at the point corresponding to a polarization distance ratio of 1.7 and a coupling factor of 14.2%. In other words, a bend or knee appears in the curve at about the point representing the case in which the polarizing connections were omitted from the two outer holes 14 and 19. It will be appreciated that performance better than that obtainable with the two-plate bender structure or with the flattened tubular structure may be expected even with somewhat less complete vertical polarization, corresponding to higher polarization distance ratios, but the ratio should not greatly exceed 1.7 or the regions in the coupling factor-distance ratio curve well below the knee of the curve will be reached, corresponding to a rapid decrease of the efficiency of utilization of the material during transducing.

With these considerations in mind, it will appear that the cross-sectional dimensions of the connecting masses of ceramic material in the central portion of the transducer body should be restricted to the extent that no point on either of the outer electroded surfaces is separated from one of the inner electrode portions by a distance through the dielectric material greater than about twice the thickness dimension of the intervening thickness portion of the body. The corresponding point on the curve plotted as described hereinabove gives a coupling factor of 13.5%. If this ratio of 2 for the maximum polarizing distance to the ideal thickness-direction polarizing distance is exceeded substantially, relatively sharp decreases in the coupling factor are to be expected, and the advantages obtained by the unique structure of the transducer body in the device of the present invention are offset by the inefficient utilization of the transducer material. If the maximum polarization distance-thickness distance ratio of 2 is not exceeded, however, the performance can be expected to exceed that obtainable with the other types of bender devices mentioned hereinabove.

It will be understood that the polarization distance ratio just mentioned may be determined for all of the devices contemplated by the present invention. Thus, referring, for example, to the transducer body illustrated in Fig. 6, reference points may be chosen on an outer surface directly over the center of a post 94. The maximum polarization distance then is measured from this reference point to the nearest internal electrode portion on the lateral surface of that post. If such a reference point can be chosen so that this distance to the nearest internal electroded surface of a connecting mass is greater than about twice the thickness of the adjacent outer thickness portion, the condition for reasonably effective polarization has been broken and the device cannot be expected to perform at all efficiently as regards the material in the neighborhood of the point so chosen.

Various limitations in shape and proportions are discussed hereinabove for efficient design of the transducer bodies in the bender devices of the present invention.

When the electrodes are arranged properly on the outer and interior surfaces of transducer bodies designed to incorporate these limitations, several useful properties result. One such property is the close relationship between the electric field configurations obtained with the parallel connection, when the potential appears between the parallel-connected outer surfaces and the interior surfaces, and with the series connection, when the potential appears between the outer electroded surfaces without a reversal of field polarity. Furthermore, and of equal importance, the fields in the outermost thickness regions of such a transducer body are both strong and predominantly thickness-directed throughout these regions with either the parallel or the series connection. In addition the advantages are realized of noncomposite structure without substantial sacrifice of mechanical coupling between the outer thickness portions.

With structures having the features just discussed it may be advantageous in certain applications, depending on considerations of electrical impedance, to apply the polarizing potential in the same thickness direction throughout, for example, by reversing the polarity of the battery 38 in the polarizing circuit shown in Fig. 1. If this is done it becomes necessary to use the parallel connection for the signal potential, for example by connecting the electrode 22 to terminal 34 and the inner electrodes 24 to terminal 33 in the Fig. 1 signal circuit. Satisfactory polarization also may be obtained in most such cases, due to the above-mentioned close relationship of field configurations using either series or parallel connections, if the connection from the central point of the polarizing source to the inner electrodes 24 is never made. Consequently, with the efficient transducer body structures under consideration, the fundamental condition of electrode circuit connections for polarizing or prepolarizing and for electric signals simply is that the electrodes carry unidirectional polarizing potentials corresponding to polarizing fields in any predetermined thickness directions in the two outer thickness portions, while for signal use during operation of the device the electrodes are connected so that signal potentials corresponding to the signal fields are directed at a given instant in the same direction as the polarization direction in one outer thickness portion but in the opposite direction from the polarization direction in the other thickness portion. Circuit connections arranged for these electric field directions result in electromechanical transducing with aiding polarity relationships between the instantaneous signal fields in both outer thickness portions when one portion expands laterally while the other contracts, and this is the necessary condition for the desired net electromechanical bending response of the entire body.

Summarizing the statements immediately hereinabove, it may be stated that, in accordance with another feature of the present invention, a bending-responsive electromechanical transducer device comprises a polycrystalline body of electromechanically sensitive dielectric material having two spaced thickness portions, generally parallel to each other and each having a substantial thickness dimension as measured at the thinnest regions thereof, joined into one body by at least three laterally separated masses of such material connecting the two thickness portions, this body, including the laterally separated connecting masses, being ceramically bonded throughout so as to be mechanically noncomposite, and the lateral distance between any point on a laterally exposed interior surface of any of the connecting masses and the closest adjacent laterally exposed surface of another of the connecting masses being less than half of the over-all width dimension of the body and also less than about five times the smaller of the aforesaid thickness dimensions of the two thickness portions. The smaller of these thickness dimensions will be, of course, the thickness dimension of each thickness portion if they have the same thickness. The device also comprises electrode means disposed on the outer surfaces of the two thickness portions and on the interior surfaces therebetween, the cross-sectional dimensions of the aforementioned connecting masses being restricted to the extent that no point on either of the outer electroded surfaces is separated from an electroded portion of the interior surfaces by a distance through the dielectric material greater than about twice the thickness dimension of the intervening outer thickness portion of the body. Furthermore, the electrode means is adapted for carrying unidirectional electric potentials corresponding to polarizing fields directed in predetermined thickness directions in the two outer thickness portions and also for carrying electric signal potentials corresponding to electric signal fields directed at a given instant in the same thickness direction as the direction of the polarizing field in one of the two thickness portions but in the opposite thickness direction from the direction of the polarizing field in the other of the thickness portions. The device further comprises mechanical means coupled to the body so that motion of this means is associated with bending of the body and with the contraction and expansion in the respective outer thickness portions thereof, which result in the desired electromechanical coupling with the signal fields therein when the material is conditioned by the aforementioned polarizing fields.

There are a number of methods for forming the transducer bodies illustrated in the drawings. Fired ceramic bodies may be produced having the over-all dimensions of the desired transducer bodies and of generally rectangular cross-section. The holes in the body illustrated in Figs. 2–4 may be drilled or otherwise routed out. A body similar to that illustrated in Fig. 5 may be produced by drilling two sets of holes in lateral directions at right angles to each other.

However, a very much easier and less expensive method of forming these ceramic bodies is disclosed and claimed in my copending application for Letters Patent of the United States Serial No. 343,055, filed concurrently herewith. This method involves applying a coagulating agent to an unrefractory form and causing contact between the form and a dispersion of the ceramic raw material to coagulate a coating of the green ceramic material on the form. The form is eliminated during the ceramic-firing operation. The outer surface portions of the body to be formed are provided by the material coagulated on the major surfaces of the form. Connecting portions at the two sides of the body may be provided by the material coagulated along the edges of the form. The connecting portion or portions between the holes in the body are provided by leaving holes in the form which are filled up during the coagulation operation. Accordingly, the shapes illustrated in Figs. 2–4 may be produced by pulling a row of closely spaced, fibrous filaments or paper strips through the coagulant and then through the dispersion to deposit ceramic raw material on all sides of the filaments or strips and also in the spaces therebetween. Upon firing, the filaments or strips burn out, leaving the internal holes or slots. The bodies shown in Figs. 5 and 6 may be pro-produced by dipping or pulling a strip of paper or similar material through the coagulant and then through the raw ceramic dispersion, the strip being provided with holes wherever connecting posts between the outer thickness portions are to be provided. The strip for forming the body shown in Fig. 5 could be a mesh of round filaments intersecting at right angles in the same plane.

The formation of the several electrodes on the transducer bodies and the application of polarizing potentials thereto have been described briefly hereinabove. Some of the novel features of these operations, including procedures adapted for handling large quantities of the transducer bodies quickly and easily, are described and claimed in my copending application for Letters Patent of the United States Serial No. 343,056, filed concurrently herewith. This application deals with the method of fabricating a transducer element in which at least one hole of capillary width extends into the element and an electrode is formed within the hole by capillary action, using a liquid suspension which is then dried. The last-mentioned application also deals with the method of fabricating a plurality of such transducer units in which they are placed side by side in a suitable supporting member for application of the outer electrodes, a conductive strip then being affixed along the entire row of elements, preferably with portions extending from this strip adjacent to each element so as to provide for individual lead connections. The resulting unitary row of elements, held together by the conducting strip, then is brought into contact with the liquid suspension for introducing electrode material by capillary action into the holes. One end of each element in the row of elements then is placed against a yieldable conductor to provide contact with the inner electrode portions, and a polarizing voltage is applied between the yieldable conductor and the two outer electrodes, through the conductive strips affixed to the row of elements. Subsequently the conductive strips are severed to separate the individual polarized elements.

It will be understood that a broad range of sizes and shapes is available for the transducer devices of the present invention. The choice of size and shape depends on the desired mechanical compliance and electrical capacitance, upon the energy available to be transduced and the mechanical force or electrical potential output desired, and upon convenience of fabrication, as will be understood by those skilled in the design and fabrication of electromechanical devices and ceramic bodies. The device illustrated in Figs. 1 and 2, for example, may have six generally circular holes about 0.007 inch in diameter separated at their nearest edges by about 0.009 inch of ceramic material, the outer thickness layers being about 0.0105 inch in thickness. Due to shrinkage during ceramic firing the dimensions of the green body are somewhat larger. When such a body, about 0.750 inch in length, is mounted as illustrated in Fig. 1, after suitable prepolarization, a force of 0.2 newton applied to the stylus 32 causes a potential of about 4.5 volts to appear across the terminals 33 and 34. Similar design parameters may be applied to each of the embodiments illustrated in the other figures of the drawings. It will be appreciated that the mechanical strength in the green as well as in the fired state, the good mechanical coupling between the outer thickness portions of the transducer body, the noncomposite nature of the transducer body, and the convenience afforded when the series connection is available for the signal electrodes all combine to give these transducer devices, especially when produced by one of the efficient procedures described hereinabove and in my aforementioned copending applications, many practical advantages for applications requiring the conversion of mechanical to electrical energy and vice versa.

While there have been described what at present are considered to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A bending-responsive electromechanical transducer device, comprising: a polycrystalline body of electromechanically sensitive dielectric material having two spaced thickness portions, generally parallel to each other and each of substantial thickness, joined into one body by at least three laterally separated masses of such material connecting said two thickness portions, said body being formed with said connecting masses from a comminuted ceramic raw material and ceramically bonded throughout so as to be mechanically non-composite; electrodes disposed individually on each outer surface of said two thickness portions and on exposed portions of the inner surfaces thereof not replaced by said laterally separated connecting masses, said electrodes being adapted to carry unidirectional electric potentials corresponding to polarizing fields directed in opposite thickness directions in said two thickness portions, and said electrodes on said outer surfaces being adapted to carry electric signal potentials corresponding to electric signal fields directed at a given instant in the same thickness direction in said two thickness portions; and mechanical means coupled to said body so that motion of said means is associated with bending of outer surface elements of said body, said bending involving at a given instant lateral contraction and expansion respectively of one and the other of said two thickness portions as constrained by said connecting masses, and said contraction and expansion being electromechanically coupled with said electric signal fields when said electromechanically sensitive material is conditioned by said oppositely directed polarizing fields in said two thickness portions of said body.

2. A bending-responsive electromechanical transducer device, comprising: a body of electromechanically sensitive titanate-type ceramic dielectric material having two spaced thickness portions, generally parallel to each other and each of substantial thickness, joined into one body by at least three laterally separated masses of such material connecting said two thickness portions, said body being formed with said connecting masses from a comminuted ceramic raw material and ceramically bonded throughout so as to be mechanically noncomposite; electrodes disposed individually on each outer surface of said two thickness portions and on exposed portions of the inner surfaces thereof not replaced by said laterally separated connecting masses, said electrodes being adapted to carry unidirectional electric potentials corresponding to polarizing fields directed in opposite thickness directions in said two thickness portions, and said electrodes on said outer surfaces being adapted to carry electric signal potentials corresponding to electric signal fields directed at a given instant in the same thickness direction in said two thickness portions; and mechanical means coupled to said body so that motion of said means is associated with bending of outer surface elements of said body, said bending involving at a given instant lateral contraction and expansion respectively of one and the other of said two thickness portions as constrained by said connecting masses, and said contraction and expansion being electromechanically coupled with said electric signal fields when said electromechanically sensitive material is conditioned by said oppositely directed polarizing fields in said two thickness portions of said body.

3. A bending-responsive electromechanical transducer device, comprising: a body of electromechanically sensitive ceramic material consisting primarily of barium titanate and having two spaced thickness portions generally parallel to each other and each of substantial thickness, joined into one body by at least three laterally separated masses of such material connecting said two thickness portions, said body being formed with said connecting masses from a comminuted ceramic raw material and ceramically bonded throughout so as to be mechanically noncomposite; electrodes disposed individually on each outer surface of said two thickness portions and on exposed portions of the inner surfaces thereof not replaced by said laterally separated connecting masses, said electrodes being adapted to carry unidirectional electric potentials corresponding to polarizing fields directed in opposite thickness directions in said two thickness portions, and said electrodes on said outer surfaces being adapted to carry electric signal potentials corresponding to electric signal fields directed at a given instant in the same thickness direction in said two thickness portions; and mechanical means coupled to said body so that motion of said means is associated with bending of outer surface elements of said body, said bending involving at a given instant lateral contraction and expansion respectively of one and the other of said two thickness portions as constrained by said connecting masses, and said contraction and expansion being electromechanically coupled with said electric signal fields when said electromechanically sensitive material is conditioned by said oppositely directed polarizing fields in said two thickness portions of said body.

4. A bending-responsive electromechanical transducer device, comprising: a polycrystalline body of electromechanically sensitive dielectric material capable of retaining remanent electrostatic polarization and having two spaced thickness portions, generally parallel to each other and each of substantial thickness, joined into one body by at least three laterally separated masses of such material connecting said two thickness portions, said body being formed with said connecting masses from a comminuted ceramic raw material and ceramically bonded throughout so as to be mechanically noncomposite; electrodes disposed individually on each other surface of said two thickness portions and on exposed portions of the inner surfaces thereof not replaced by said laterally separated connecting masses, said two thicknesses portions having substantial remanent polarization of the type obtainable by applying to said electrodes unidirectional electric potentials corresponding to polarizing fields directed in opposite thickness directions in said two thickness portions, and said electrodes on said outer surfaces being adapted to carry electric signal potentials corresponding to electric signal fields directed at a given instant in the same thickness direction in said two thickness portions; and mechanical means coupled to said body so that motion of said means is associated with bending of outer surface elements of said body, said bending involving at a given instant lateral contraction and expansion respectively of one and the other of said two oppositely polarized thickness portions as constrained by said laterally separated connecting masses, and said contraction and expansion being electromechanically coupled with said electric signal fields between said electrodes on said outer surfaces.

5. A bending-responsive electromechanical transducer device, comprising: a polycrystalline body of electromechanically sensitive dielectric material having two spaced thickness portions, generally parallel to each other and each having a substantial thickness dimension, as measured at the thinnest regions thereof, joined into one body by at least three laterally separated masses of such material connecting said two thickness portions, said body being formed with said connecting masses from a comminuted ceramic raw material and ceramically bonded throughout so as to be mechanically noncomposite, and said thickness dimensions on each side of said connecting masses being substantially equal; electrodes disposed individually on each outer surface of said two thickness portions and on exposed portions of the inner surfaces thereof not replaced by said laterally separated connecting masses, said electrodes being adapted to carry unidirectional electric potentials corresponding to polarizing fields directed in opposite thickness directions in said two thickness portions, and said electrodes on said outer surfaces being adapted to carry electric signal potentials corresponding to electric signal fields directed at a given instant in the same thickness direction in said two thickness portions; and mechanical means coupled to said body so that motion of said means is associated with bending of outer surface elements of said body, said bending involving at a given instant lateral contraction and expansion respectively of one and the other of said two thickness portions as constrained by said connecting masses, and said contraction and expansion being electromechanically coupled with said electric signal fields when said electromechanically sensitive material is conditioned by said oppositely directed polarizing fields in said two thickness portions of said body.

6. A bending-responsive electromechanical transducer device, comprising: a polycrystalline body of electromechanically sensitive dielectric material having two spaced outer thickness portions, generally parallel to each other and each having a substantial thickness dimension as measured at the thinnest regions thereof, joined into one body by at least three laterally separated masses of such material connecting said two thickness portions, said body being formed with said connecting masses from a comminuted ceramic raw material and ceramically bonded throughout so as to be mechanically noncomposite, and the interior thickness dimension, as measured between said two outer thickness portions having said substantial thickness dimensions, being between about one quarter and one half of the over-all thickness dimension of said body; electrodes disposed individually on each outer surface of said two outer thickness portions and on exposed portions of the inner surfaces thereof not replaced by said laterally separated connecting masses, said electrodes being adapted to carry unidirectional electric potentials corresponding to polarizing fields directed in opposite thickness directions in said two outer thickness portions, and said electrodes on said outer surfaces being adapted to carry electric signal potentials corresponding to electric signal fields directed at a given instant in the same thickness direction in said two outer thickness portions; and mechanical means coupled to said body so that motion of said means is associated with bending of outer surface elements of said body, said bending involving at a given instant lateral contraction and expansion respectively of one and the other of said two outer thickness portions as constrained by said connecting masses, and said contraction and expansion being electromechanically coupled with said electric signal fields when said electromechanically sensitive material is conditioned by said oppositely directed polarizing fields in said two outer thickness portions of said body.

7. A bending-responsive electromechanical transducer device, comprising: a polycrystalline body of electromechanically sensitive dielectric material having two spaced thickness portions, generally parallel to each other and each of substantial thickness, joined into one body by at least three laterally separated masses of such material connecting said two thickness portions, said body being formed with said connecting masses from a comminuted ceramic raw material and ceramically bonded throughout so as to be mechanically noncomposite, and the lateral distance between any point on a laterally exposed interior surface of any of said connecting masses and the closest adjacent laterally exposed surface of another of said connecting masses being less than half of the over-all width dimension of said body; electrodes disposed individually on each outer surface of said two thickness portions and on exposed portions of the inner surfaces thereof not replaced by said laterally separated connecting masses, said electrodes being adapted to carry unidirectional electric potentials corresponding to polarizing fields directed in opposite thickness directions in said two thickness portions, and said electrodes on said outer surfaces being adapted to carry electric signal potentials corresponding to electric signal fields directed at a given instant in the same thickness direction in said two thickness portions; and mechanical means coupled to said body so that motion of said means is associated with bending of outer surface elements of said body, said bending involving at a given instant lateral contraction and expansion respectively of one and the other of said two thickness portions as constrained by said connecting masses, and said contraction and expansion being electromechanically coupled with said electric signal fields when said electromechanically sensitive material is conditioned by said oppositely directed polarizing fields in said two thickness portions of said body.

8. A bending-responsive electromechanical transducer device, comprising: a polycrystalline body of electromechanically sensitive dielectric material having two spaced thickness portions, generally parallel to each other and each having a substantial thickness dimension as measured at the thinnest regions thereof, joined into one body by at least three laterally separated masses of such material connecting said two thickness portions, said body being formed with said connecting masses from a comminuted ceramic raw material and ceramically bonded throughout so as to be mechanically noncomposite, and the lateral distance between any point on a laterally exposed interior surface of any of said connecting masses and the closest adjacent laterally exposed surface of another of said connecting masses being less than half of the over-all width dimension of said body; outer electrodes disposed individually on each outer surface of said two thickness portions, and inner electrode portions disposed on exposed portions of the inner surfaces of said two thickness portions not replaced by said laterally separated connecting masses, the cross-sectional dimensions of said connecting masses being restricted to the extent that no point on either of said outer electroded surfaces is separated from one of said inner electrode portions by a distance through said dielectric material greater than about twice said substantial thickness dimension of the intervening thickness portion of said body, said outer electrodes and inner electrode portions being adapted to carry unidirectional electric potentials corresponding to polarizing fields directed in opposite thickness directions in said two thickness portions, and said outer electrodes being adapted to carry electric signal potentials corresponding to electric signal fields directed at a given instant in the same thickness direction in said two thickness portions; and mechanical means coupled to said body so that motion of said means is associated with bending of outer surface elements of said body, said bending involving at a given instant lateral contraction and expansion respectively of one and the other of said two thickness portions as constrained by said connecting masses, and said contraction and expansion being electromechanically coupled with said electric signal fields when said electromechanically sensitive material is conditioned by said oppositely directed polarizing fields in said two thickness portions of said body.

9. A bending-responsive electromechanical transducer device, comprising: a polycrystalline body of electromechanically sensitive material having two spaced thickness portions, generally parallel to each other and each having a substantial thickness dimension as measured at the thinnest regions thereof, joined into one body by at least three laterally separated masses of such material connecting said two thickness portions, said body being formed with said connecting masses from a comminuted ceramic raw material and ceramically bonded throughout so as to be mechanically noncomposite, and the lateral distance between any point on a laterally exposed interior surface of any of said connecting masses and the closest adjacent laterally exposed surface of another of said connecting masses being less than about five times the smaller of said substantial thickness dimensions of said two thickness portions; outer electrodes disposed individually on each outer surface of said two thickness portions, and inner electrode portions disposed on exposed portions of the inner surfaces of said two thickness portions not replaced by said laterally separated connecting masses, the cross-sectional dimensions of said connecting masses being restricted to the extent that no point on either of said outer electroded surfaces is separated from one of said inner electrode portions by a distance through said dielectric material greater than about twice said substantial thickness dimension of the intervening thickness portion of said body, said outer electrodes and inner electrode portions being adapted to carry unidirectional electric potentials corresponding to polarizing fields directed in opposite thickness directions in said two thickness portions, and said outer electrodes being adapted to carry electric signal potentials corresponding to electric signal fields directed at a given instant in the same thickness direction in said two thickness portions; and mechanical means coupled to said body so that motion of said means is associated with bending of outer surface elements of said body, said bending involving at a given instant lateral contraction and expansion respectively of one and the other of said two thickness portions as constrained by said connecting masses, and said contraction and expansion being electromechanically coupled with said electric signal fields when said electromechanically sensitive material is conditioned by said oppositely directed polarizing fields in said two thickness portions of said body.

10. A bending-responsive electromechanical transducer device, comprising: a polycrystalline body of electromechanically sensitive dielectric material having two spaced thickness portions, generally parallel to each other and each having a substantial thickness dimension as measured at the thinnest regions thereof, joined into one body by at least three laterally separated masses of such material connecting said two thickness portions, said body being formed with said connecting masses from a comminuted ceramic raw material and ceramically bonded throughout so as to be mechanically noncomposite, and the lateral distance between any point on a laterally exposed interior surface of any of said connecting masses and the closest adjacent laterally exposed surface of another of said connecting masses being less than half of the over-all width dimension of said body and also less than about five times the smaller of said substantial thickness dimensions of said two thickness portions; electrodes disposed individually on each outer surface of said two thickness portions and on exposed portions of the inner surfaces thereof not replaced by said laterally separated connecting masses, said electrodes being adapted to carry unidirectional electric potentials corresponding to polarizing fields directed in opposite thickness directions in said two thickness portions, and said electrodes on said outer surfaces being adapted to carry electric signal potentials corresponding to electric signal fields directed at a given instant in the same thickness direction in said two thickness portions; and mechanical means coupled to said body so that motion of said means is associated with bending of outer surface elements of said body, said bending involving at a given instant lateral contraction and expansion respectively of one and the other of said two thickness portions as constrained by said connecting masses, and said contraction and expansion being electromechanically coupled with said electric signal fields when said electromechanically sensitive material is conditioned by said oppositely directed polarizing fields in said two thickness portions of said body.

11. A bending-responsive electromechanical transducer device, comprising: a polycrystalline body of electromechanically sensitive dielectric material having two spaced thickness portions, generally parallel to each other and each having a substantial thickness dimension as measured at the thinnest regions thereof, joined into one body by at least three laterally separated masses of such material connecting said two thickness portions, said body being formed with said connecting masses from a comminuted ceramic raw material and ceramically bonded throughout so as to be mechanically non-composite, and the lateral distance between any point on a laterally exposed interior surface of any of said connecting masses and the closest adjacent laterally exposed surface of another of said connecting masses being less than half of the over-all width dimension of said body and also less than about five times the smaller of said substantial thickness dimensions of said two thickness portions; outer electrodes disposed individually on each outer surface of said two thickness portions, and inner electrode portions disposed on exposed portions of the inner surfaces of said two thickness portions not replaced by said laterally separated connecting masses, the cross-sectional dimensions of said connecting masses being restricted to the extent that no point on either of said outer electroded surfaces is separated from one of said inner electrode portions by a distance through said dielectric material greater than about twice said substantial thickness dimension of the intervening thickness portion of said body, said outer electrodes and inner electrode portions being adapted to carry unidirectional electric potentials corresponding to polarizing fields directed in opposite thickness directions in said two thickness portions, and said outer electrodes being adapted to carry electric signal potentials corresponding to electric signal fields directed at a given instant in the same thickness direction in said two thickness portions; and mechanical means coupled to said body so that motion of said means is associated with bending of outer surface elements of said body, said bending involving at a given instant lateral contraction and expansion respectively of one and the other of said two thickness portions as constrained by said connecting masses, and said contraction and expansion being electromechanically coupled with said electric signal fields when said electromechanically sensitive material is conditioned by said oppositely directed polarizing fields in said two thickness portions of said body.

12. A bending-responsive electromechanical transducer device, comprising: a polycrystalline body of electromechanically sensitive dielectric material having two spaced thickness portions, generally parallel to each other and each having a substantial thickness dimension as measured at the thinnest regions thereof, joined into one body by at least three laterally separated masses of such material connecting said two thickness portions, said body being formed with said connecting masses from a comminuted ceramic raw material and ceramically bonded throughout so as to be mechanically non-composite, and the lateral distance between any point on a laterally exposed interior surface of any of said connecting masses and the closest adjacent laterally exposed surface of another of said connecting masses being less than half of the over-all width dimension of said body and also less than about five times the smaller of said substantial thickness dimensions of said two thickness portions; electrode means disposed on the outer surfaces of said two thickness portions and on the exposed interior surfaces therebetween, the cross-sectional dimensions of said connecting masses being restricted to the extent that no point on either of said outer electroded surfaces is separated from an electroded portion of said interior surfaces by a distance through said dielectric material greater than about twice said substantial thickness dimension of the intervening thickness portion of said body, and said electrode means being adapted for carrying unidirectional electric potentials corresponding to polarizing fields directed in predetermined thickness directions in said two thickness portions and also for carrying electric signal potentials corresponding to electric signal fields directed at a given instant in the same thickness direction as the direction of said polarizing field in one of said two thickness portions but in the opposite thickness direction from the direction of said polarizing field in the other of said thickness portions; and mechanical means coupled to said body so that motion of said means is associated with bending of outer surface elements of said body, said bending involving at a given instant lateral contraction and expansion respectively of one and the other of said two thickness portions as constrained by said connecting masses, and said contraction and expansion being electromechanically coupled with said electric signal fields when said electromechanically sensitive material is conditioned by said polarizing fields in said two thickness portions of said body.

13. A bending-responsive electromechanical transducer device, comprising: a polycrystalline body of electromechanically sensitive dielectric material having two spaced opposed outer thickness portions of substantial thickness and having therebetween a central thickness portion subdivided by a plurality of generally parallel spaced holes extending through said dielectric material, said body being formed with said holes therein from a comminuted ceramic raw material and ceramically bonded throughout so as to be mechanically noncomposite; electrodes disposed individually on each outer surface of said two outer thickness portions and additional electrodes disposed only on the inner surfaces of said holes, said electrodes being adapted to carry unidirectional electric potentials corresponding to polarizing fields directed in opposite thickness directions in said two outer thickness portions, and said electrodes on said outer surfaces being adapted to carry electric signal potentials corresponding to electric signal fields directed at a given instant in the same thickness direction in said two outer thickness portions; and mechanical means coupled to said body so that motion of said means is associated with bending of outer surface elements of said body, said bending involving at a given instant lateral contraction and expansion respectively of one and the other of said two outer thickness portions as constrained by said central thickness portion, and said contraction and expansion being electromechanically coupled with said electric signal fields when said electromechanically sensitive material is conditioned by said oppositely directed polarizing fields in said two outer thickness portions of said body.

14. A bending-responsive electromechanical transducer device, comprising: a polycrystalline body of electromechanically sensitive dielectric material having two spaced opposed outer thickness portions of substantial thickness and having therebetween a central thickness portion subdivided by a plurality of generally parallel spaced holes extending through said dielectric material, said body being formed with said holes therein from a comminuted ceramic raw material and ceramically bonded throughout so as to be mechanically noncomposite; electrodes disposed individually on each outer surface of said two outer thickness portions and additional electrodes disposed only on the inner surfaces of said holes, said electrodes being adapted to carry unidirectional electric potentials corresponding to polarizing fields directed in opposite thickness directions in said two outer thickness portions, and said electrodes on said outer surfaces being adapted to carry electric signal potentials corresponding to electric signal fields directed at a given instant in the same thickness direction in said two outer thickness portions; and mechanical means coupled to said body so that motion of said means is associated with bending of said body about an axis generally parallel to said outer surfaces and generally perpendicular to said holes, said bending involving at a given instant lateral contraction and expansion respectively of one and the other of said two outer thickness portions as constrained by said central thickness portion, and said contraction and expansion being electromechanically coupled with said electric signal fields when said electromechanically sensitive material is conditioned by said oppositely directed polarizing fields in said two outer thickness portions of said body.

15. A bending-responsive electromechanical transducer device, comprising: a polycrystalline body of electromechanically sensitive dielectric material having two spaced opposed outer thickness portions, each with a substantial thickness dimension as measured at the thinnest regions thereof, and having therebetween a central thickness portion subdivided by a plurality of generally parallel spaced holes extending through said dielectric material, said body being formed with said holes therein from a comminuted ceramic raw material and ceramically bonded throughout so as to be mechanically noncomposite, and the cross-sectional width of each of said holes being less than about five times the smaller of said substantial thickness dimensions of said two outer thickness portions; outer electrodes disposed individually on each outer surface of said two outer thickness portions, and inner electrode portions disposed only on the inner surfaces of said holes, the lateral spacing between adjacent ones of said spaced holes being restricted to the extent that no point on either of said outer electroded surfaces is separated from one of said inner electrode portions by a distance through said dielectric material greater than about twice said substantial thickness dimension of the intervening thickness portion of said body, said outer electrodes and inner electrode portions being adapted to carry unidirectional electric potentials corresponding to polarizing fields directed in opposite thickness directions in said two outer thickness portions, and said outer electrodes being adapted to carry electric signal potentials corresponding to electric signal fields directed at a given instant in the same thickness direction in said two outer thickness portions; and mechanical means coupled to said body so that motion of said means is associated with bending of outer surface elements of said body, said bending involving at a given instant lateral contraction and expansion respectively of one and the other of said two outer thickness portions as constrained by said central thickness portion, and said contraction and expansion being electromechanically coupled with said electric signal fields when said electromechanically sensitive material is conditioned by said oppositely directed polarizing fields in said two outer thickness portions of said body.

16. A bending-responsive electromechanical transducer device, comprising: a polycrystalline body of electromechanically sensitive dielectric material having two spaced opposed outer thickness portions of substantial thickness and having therebetween a central thickness portion subdivided by a plurality of generally parallel spaced holes, generally circular in cross section, extending through said dielectric material, said body being formed with said holes therein from a comminuted ceramic raw material and ceramically bonded throughout so as to be mechanically noncomposite; electrodes disposed individually on each outer surface of said two outer thickness portions and additional electrodes disposed only on the inner surfaces of said holes, said electrodes being adapted to carry unidirectional electric potentials corresponding to polarizing fields directed in opposite thickness directions in said two outer thickness portions, and said electrodes on said outer surfaces being adapted to carry electric signal potentials corresponding to electric signal fields directed at a given instant in the same thickness direction in said two outer thickness portions; and mechanical means coupled to said body so that motion of said means is associated with bending of outer surface elements of said body, said bending involving at a given instant lateral contraction and expansion respectively of one and the other of said two outer thickness portions as constrained by said central thickness portion, and said contraction and expansion being electromechanically coupled with said electric signal fields when said electromechanically sensitive material is conditioned by said oppositely directed polarizing fields in said two thickness portions of said body.

17. A bending-responsive electromechanical transducer device, comprising: a polycrystalline body of electromechanically sensitive dielectric material, having two spaced opposed outer thickness portions with substantial thickness dimensions as measured at the thinnest regions thereof, and having therebetween a central thickness portion subdivided by a plurality of generally parallel spaced holes extending through said dielectric material, each of said holes being formed with said holes therein from a comminuted ceramic raw material and generally rectangular with its cross-sectional width at least twice as great as the thickness of said central thickness portion but less than about five times the smaller of said substantial thickness dimensions of said two outer thickness portions, and said body being ceramically bonded throughout so as to be mechanically noncomposite; electrodes disposed individually on each outer surface of said two outer thickness portions and additional electrodes disposed only on the inner surfaces of said holes, said electrodes being adapted to carry unidirectional electric potentials corresponding to polarizing fields directed in opposite thickness directions in said two outer thickness portions, and said electrodes on said outer surfaces being adapted to carry electric signal potentials corresponding to electric signal fields directed at a given instant in the same thickness direction in said two outer thickness portions; and mechanical means coupled to said body so that motion of said means is associated with bending of outer surface elements of said body, said bending involving at a given instant lateral contraction and expansion respectively of one and the other of said two outer thickness portions as constrained by said central thickness portion, and said contraction and expansion being electromechanically coupled with said electric signal fields when said electromechanically sensitive material is conditioned by said oppositely directed polarizing fields in said two thickness portions of said body.

18. A bending-responsive electromechanical transducer device, comprising: a polycrystalline body of electromechanically sensitive dielectric material having two spaced thickness portions, generally parallel to each other and each of substantial thickness, joined into one body by at least several laterally separated posts of such material connecting said two thickness portions, said body being formed with said posts from a comminuated ceramic raw material and ceramically bonded throughout so as to be mechanically noncomposite; electrodes disposed individually on each outer surface of said two thickness portions and on portions of the inner surfaces thereof not replaced by said laterally separated posts, said electrodes being adapted to carry unidirectional electric potentials corresponding to polarizing fields directed in opposite thickness directions in said two thickness portions, and said electrodes on said outer surfaces being adapted to carry electric signal potentials corresponding to electric signal fields directed at a given instant in the same thickness direction in said two thickness portions; and mechanical means coupled to said body so that motion of said means is associated with bending of outer surface elements of said body, said posts being sufficiently numerous and mutually spaced sufficiently closely effectively to couple together mechanically all opposed areas of said two thickness portions by shear in said posts whereby said bending involves at a given instant lateral contraction and expansion respectively of one and the other of said two thickness portions as constrained by said posts, said contraction and expansion being electromechanically coupled with said electric signal fields when said electromechanically sensitive material is conditioned by said polarizing fields directed oppositely in said two thickness portions of said body.

19. A bending-responsive electromechanical transducer device, comprising: a polycrystalline body of electromechanically sensitive dielectric material having two spaced thickness portions, generally parallel to each other and each of substantial thickness, joined into one body by at least several laterally separated posts of such material connecting said two thickness portions, the lateral distance between any point on a laterally exposed internal surface of any of said posts and the closest adjacent laterally exposed surface of another of said posts being less than half of the over-all width dimension of said body, and said body being formed with said posts from a comminuted ceramic raw material and ceramically bonded throughout so as to be mechanically noncomposite; electrodes disposed individually on each outer surface of said two thickness portions and on portions of the inner surfaces thereof not replaced by said laterally separated posts, said electrodes being adapted to carry unidirectional electric potentials corresponding to polarizing fields directed in opposite thickness directions in said two thickness portions, and said electrodes on said outer surfaces being adapted to carry electric signal potentials corresponding to electric signal fields directed at a given instant in the same thickness direction in said two thickness portions; and mechanical means coupled to said body so that motion of said means is associated with bending of outer surface elements of said body, said bending involving at a given instant lateral contraction and expansion respectively of one and the other of said two thickness portions as constrained by said posts, and said contraction and expansion being electromechanically coupled with said electric signal fields when said electromechanically sensitive material is conditioned by said polarizing fields directed oppositely in said two thickness portions of said body.

20. A bending-responsive electromechanical transducer device, comprising: a titanate-type ceramic dielectric body exhibiting substantial electromechanical response when polarized, having two spaced opposed outer thickness portions, and having therebetween a central thickness portion subdivided by a plurality of generally parallel spaced holes, said body being formed with said holes therein from a comminuted ceramic raw material and ceramically bonded throughout so as to be mechanically noncomposite; electrodes individually on the outer surfaces of said body and inner electrodes disposed within said holes only, said two thickness portions having substantial remanent polarization in opposite thickness directions as obtained by temporarily applying a unidirectional electric potential between said electrodes within said holes and both of said outer electrodes; and mechanical means coupled to said body so that a force applied to move said coupling means causes bending deformations of said body with lateral contraction and expansion respectively of said two oppositely polarized thickness portions, whereby said motion of said coupling means develops an electric signal field between said electrodes on said outer surfaces and vice versa.

References Cited in the file of this patent

UNITED STATES PATENTS

| | | |
|---|---|---|
| 1,746,788 | Marrison | Feb. 11, 1930 |
| 1,947,049 | Koch | Feb. 13, 1934 |
| 2,047,252 | Bloomenthal | July 14, 1936 |
| 2,373,445 | Baerwald | Apr. 10, 1945 |
| 2,395,434 | Tenenbaum | Feb. 26, 1946 |
| 2,479,987 | Williams | Aug. 23, 1949 |
| 2,484,950 | Jaffe | Oct. 18, 1949 |
| 2,497,108 | Williams | Feb. 14, 1950 |
| 2,524,579 | Taylor | Oct. 3, 1950 |
| 2,614,143 | Williams | Oct. 14, 1952 |
| 2,633,543 | Howatt | Mar. 31, 1953 |

UNITED STATES PATENT OFFICE
CERTIFICATE OF CORRECTION

Patent No. 2,841,722

July 1, 1958

Charles K. Gravley

It is hereby certified that error appears in the printed specificatio of the above numbered patent requiring correction and that the said Letter Patent should read as corrected below.

Column 6, line 51, for "sequeegee" read --squeegee--; line 65, for "surface" read --surfaces--; column 11, line 10, for "arrangements" read --arrangement--; column 16, line 9, before "outer" insert --two--; line 47, for "staggering" read --saggering--; column 23, line 20, for "other" read --outer--.

Signed and sealed this 7th day of October 1958.

(SEAL)
Attest:

KARL H. AXLINE

Attesting Officer

ROBERT C. WATSON
Commissioner of Patents